(12) United States Patent
Schwenter et al.

(10) Patent No.: US 11,933,806 B2
(45) Date of Patent: Mar. 19, 2024

(54) MEASURING TRANSDUCER AND MEASUREMENT DEVICE

(71) Applicant: Endress+Hauser Flowtec AG, Reinach (CH)

(72) Inventors: Benjamin Schwenter, Breitenbach (CH); Marc Werner, Grenzach-Wyhlen (DE); Claude Hollinger, Aesch (CH); Martin Stucki, Pratteln (CH)

(73) Assignee: Endress+Hauser Flowtec AG, Reinach (CH)

( * ) Notice: Subject to any disclaimer, the term of this patent is extended or adjusted under 35 U.S.C. 154(b) by 424 days.

(21) Appl. No.: 17/266,985

(22) PCT Filed: Jul. 30, 2019

(86) PCT No.: PCT/EP2019/070487
§ 371 (c)(1),
(2) Date: Feb. 8, 2021

(87) PCT Pub. No.: WO2020/030472
PCT Pub. Date: Feb. 13, 2020

(65) Prior Publication Data
US 2021/0310920 A1 Oct. 7, 2021

(30) Foreign Application Priority Data
Aug. 8, 2018 (DE) ...................... 10 2018 119 332.7

(51) Int. Cl.
*G01N 9/00* (2006.01)
*G01F 1/84* (2006.01)
*H01F 27/28* (2006.01)

(52) U.S. Cl.
CPC ........... *G01N 9/002* (2013.01); *G01F 1/8422* (2013.01); *G01F 1/8427* (2013.01);
(Continued)

(58) Field of Classification Search
CPC .............. G01N 9/002; G01N 2009/006; G01F 1/8422; G01F 1/8427; G01F 1/8431; G01F 1/8477; H01F 27/2804; H01F 2027/2809
(Continued)

(56) References Cited

U.S. PATENT DOCUMENTS 4,801,897 A * 1/1989 Flecken ................ G01F 1/8495
73/861.357
5,349,872 A 9/1994 Kalotay et al.
(Continued)

FOREIGN PATENT DOCUMENTS

CA 2341598 C * 10/2003 ........... G01F 1/8413
CN 1314993 A 9/2001
(Continued)

OTHER PUBLICATIONS

Normann, Randy A., Developing 300° C. Ceramic Circuit Boards, Perma Works, LLC Document #PW10185-3, Feb. 15, 2015, 16 pp.
(Continued)

*Primary Examiner* — Stephanie E Bloss
*Assistant Examiner* — Kevin C Butler
(74) *Attorney, Agent, or Firm* — Kelly J. Smith; Endress+Hauser (USA) Holding, Inc.

(57) ABSTRACT

The present disclosure relates to a measuring transducer of a measurement device for registering a mass flow or a density of a medium The measuring transducer includes a measuring tube, at least one exciter adapted to excite the measuring tube to execute oscillations, and two sensors adapted to register deflection of oscillations of the measuring tube. The exciter and the sensors each have a coil device including a circuit board with a first coefficient of thermal expansion. The coil device of the sensors or exciter are/is secured using a holder apparatus adapted to clamp the circuit board, wherein the circuit board is mechanically contacted
(Continued)

by the holder apparatus using at least one holder element, wherein the holder element has a second coefficient of thermal expansion, wherein the first coefficient of thermal expansion and the second coefficient of thermal expansion differ from one another by less than $3*10^{-6}$/Kelvin.

9 Claims, 3 Drawing Sheets

(52) U.S. Cl.
CPC .......... *G01F 1/8431* (2013.01); *G01F 1/8477* (2013.01); *H01F 27/2804* (2013.01); *G01N 2009/006* (2013.01); *H01F 2027/2809* (2013.01)

(58) Field of Classification Search
USPC .......................................................... 73/32
See application file for complete search history.

(56) References Cited

U.S. PATENT DOCUMENTS

| | | | | |
|---|---|---|---|---|
| 5,987,998 | A * | 11/1999 | Campbell | G01F 1/8422 73/861.357 |
| 2006/0243066 | A1* | 11/2006 | Mehendale | G01F 1/8486 73/861.353 |
| 2011/0197681 | A1 | 8/2011 | Rieder et al. | |
| 2017/0146380 | A1* | 5/2017 | Young | G01F 1/8409 |
| 2022/0163362 | A1* | 5/2022 | Schwenter | G01F 1/8427 |

FOREIGN PATENT DOCUMENTS

| | | | | |
|---|---|---|---|---|
| CN | 102348963 | A | | 2/2012 |
| CN | 113597539 | A * | 11/2021 | ........... G01F 1/8422 |
| CN | 114096812 | A * | 2/2022 | ........... G01F 1/8422 |
| CN | 114341597 | A * | 4/2022 | ........... G01F 1/8427 |
| DE | 19825775 | A1 * | 5/1999 | ........... G01F 1/8409 |
| DE | 102015120087 | A1 | 5/2017 | |
| DE | 102015120087 | A1 * | 5/2017 | |
| DE | 102018119332 | A1 * | 2/2020 | ........... G01F 1/8413 |
| DE | 102018131742 | A1 * | 6/2020 | ........... G01F 1/8422 |
| DE | 102019119231 | A1 * | 1/2021 | ........... G01F 1/8422 |
| DE | 102020112154 | A1 * | 11/2021 | ........... G01F 1/8422 |
| EP | 262573 | A * | 4/1988 | ........... G01F 1/8422 |
| EP | 0908705 | A2 | 4/1999 | |
| EP | 1105700 | B1 | 8/1999 | |
| EP | 1105700 | A1 | 6/2001 | |
| EP | 1105700 | B1 * | 10/2003 | ........... G01F 1/8413 |
| EP | 0908705 | B1 | 6/2004 | |
| EP | 1719983 | A1 * | 11/2006 | ........... G01F 1/8422 |
| EP | 2078936 | A1 * | 7/2009 | ........... G01F 1/6845 |
| EP | 3380816 | B1 * | 9/2020 | ........... G01F 1/8404 |
| ES | 2764717 | T3 * | 6/2020 | ........... G01F 1/8427 |
| KR | 20230044001 | A * | 3/2023 | ........... G01F 1/8422 |
| NL | 1034905 | C2 * | 7/2009 | ........... G01F 1/6845 |
| WO | WO-2017123089 | A1 * | 7/2017 | ........... G01F 1/8427 |
| WO | WO-2020030472 | A1 * | 2/2020 | ........... G01F 1/8413 |
| WO | WO-2020035302 | A1 * | 2/2020 | ........... G01F 1/8422 |
| WO | WO-2023011944 | A1 * | 2/2023 | |

OTHER PUBLICATIONS

Wang, Hong, Yao, X., Bismuth-based pyrochlore dielectric ceramics for microwave applications, Handbook of Advanced Dielectric, Piezoelectric and Ferroelectric Materials, 2008, https://www.sciencedirect.com/topics/chemistry/dielectric-response, 4 pp. (last accessed Jul. 22, 2019).

Wikipedia, Thermal expansion, https://en.wikipedia.org/w/index.php.thermal_expansion, 13 pp. (last accessed Jul. 22, 2019).

* cited by examiner

MEASURING TRANSDUCER AND MEASUREMENT DEVICE

CROSS-REFERENCE TO RELATED APPLICATIONS

The present application is related to and claims the priority benefit of German Patent Application No. 10 2018 119 332.7, filed on Aug. 8, 2018 and International Patent Application No. PCT/EP2019/070487 filed on Jul. 30, 2019, the entire contents of which are incorporated herein by reference.

TECHNICAL FIELD

The invention relates to a measuring transducer of a measurement device for registering a mass flow or a density of a medium flowing through at least one measuring tube of the measuring transducer, wherein an exciter is adapted to excite the at least one measuring tube to oscillate, and wherein at least two sensors are adapted to register measuring tube oscillations. The invention relates, furthermore, to a measurement device, which comprises such a measuring transducer.

BACKGROUND

The above mentioned exciter and/or sensors usually each involve a coil device having a coil, which is arranged on or in a circuit board; see, for example, DE102015120087A1. The coil devices of the exciter and/or sensors are, for their part, mounted via a holder on a measuring tube or a support body of the measuring transducer. In the case of high temperature applications, a necessary mechanical contact between the circuit board and a holder of the circuit board can change after repeated temperature alternations and even lead in the case of high temperature to a damaging of the circuit board.

SUMMARY

An object of the invention is, consequently, to provide a measuring transducer, which is stable under high temperature, as well as a measurement device comprising such a measuring transducer.

The object is achieved by a measuring transducer as well as a measurement device as defined in the present disclosure.

A measuring transducer of the invention for a measurement device for registering a mass flow or a density of a medium flowing through at least one measuring tube of the measuring transducer comprises:
the at least one measuring tube having an inlet and an outlet and adapted to convey the medium between inlet and outlet;
at least one exciter, which is adapted to excite the at least one measuring tube to execute oscillations;
at least two sensors, which are adapted to register deflection of oscillations of at least one measuring tube;
wherein at least one exciter as well as the sensors have, in each case, a coil device with, in each case, at least one coil, as well as, in each case, a magnet apparatus, wherein the magnet apparatuses are movable relative to their coil devices, and
wherein the magnet apparatus and the coil device of an exciter, or sensor, interact with one another by means of magnetic fields,
wherein the coil device has a circuit board having at least one circuit board layer, wherein the coil is arranged on and/or in at least one circuit board layer, wherein the circuit board has a first coefficient of thermal expansion,
wherein the measuring transducer includes a support body, which is adapted to hold the measuring tube,
characterized in that at least one coil device of the sensors and/or the coil device of the exciter are/is secured by means of a holder apparatus to the support body or to a measuring tube,
wherein the holder apparatus is adapted to clamp the circuit board, in order to hold the circuit board by means of lateral frictional interlocking, wherein the circuit board is mechanically contacted by the holder apparatus by means of at least one holder element of the holder apparatus,
wherein the holder element has a second coefficient of thermal expansion,
wherein the first coefficient of thermal expansion and the second coefficient of thermal expansion differ from one another by less than $3*10^{-6}$/Kelvin, and, especially, less than $2*10^{-6}$/Kelvin and preferably less than $1.5*10^{-6}$/Kelvin.

In an embodiment, the circuit board is produced by a sintering process, wherein the circuit board comprises, for example, a ceramic material,
wherein the ceramic material is especially a low temperature cofired ceramic.

Low temperature cofired ceramics (LTCC) are especially suited for producing coil devices due to their good properties as regards low disturbance of coil properties and good applicability of electrically conductive traces, which can be used for forming coils. A disadvantage of such ceramics is, however, as compared with metals, that they are brittle, and, thus, have an increased sensitivity to mechanical loading. By selecting the first coefficient of thermal expansion and the second coefficient of thermal expansion according to the invention, this disadvantage can, however, be avoided.

In an embodiment, the holder element comprises at least one of the following materials: zirconium, titanium, tantalum.

Low differences between the coefficients of thermal expansion result especially from using low temperature cofired ceramic as circuit board.

In an embodiment, the first coefficient of thermal expansion is less than $9*10^{-6}$/Kelvin, and, especially, less than $8*10^{-6}$/Kelvin, and preferably less than $7*10^{-6}$/Kelvin.

A high coefficient of thermal expansion of the circuit board can disadvantageously affect magnetic properties of the coil, since, for example, inductance of a coil depends on, among other things, its geometric dimensions, which inductance, thus, would change with temperature change. Such is disadvantageous, for example, as regards measuring signal evaluation.

In an embodiment, the circuit board is held by means of a screw, clamp, or by means of at least one rivet or at least one bolt.

In an embodiment, the holder element is secured to a holder apparatus body.

The holder apparatus body can, in such case, be arranged on the measuring tube or on the support body.

In an embodiment, the circuit board includes a bore, in which a screw is arranged, which engages in a screw thread of a bore of the holder apparatus, wherein by means of the screw a compression is exerted on the circuit board.

In an embodiment, the holder apparatus is secured to the support body. Such is advantageous, since then the support body is largely decoupled acoustically from the measuring tube and the coil device is practically not influenced by measuring tube movements. This increases the holdability of the coil device.

In an embodiment, the measuring transducer includes two manifolds, wherein a first manifold is adapted on an upstream side of the measuring transducer to receive a medium coming from a pipeline into the measuring transducer and to convey the medium to the inlet of the at least one measuring tube, wherein a second manifold is adapted to receive medium coming from the outlet of the at least one measuring tube and to convey such back into the pipeline.

In an embodiment, the measuring transducer includes two process connections, especially flanges, which are adapted to connect the measuring transducer into a pipeline.

A measurement device of the invention comprises:
a measuring transducer of one of the above described embodiments;
an electronic measuring/operating circuit, wherein the electronic measuring/operating circuit is adapted to operate the sensors and the exciter, and is connected with such by means of electrical connection lines,
wherein the at least one electrical connection is led by means of a cable guide to the electronic measuring/operating circuit,
wherein the electronic measuring/operating circuit is further adapted to ascertain mass flow measured values and/or density measurement values, and
wherein the measurement device has especially an electronics housing for housing the electronic measuring/operating circuit.

BRIEF DESCRIPTION OF THE DRAWINGS

The invention will now be described based on examples of embodiments presented in the appended drawing, the figures of which show as follows.

DETAILED DESCRIPTION

Figure 1:
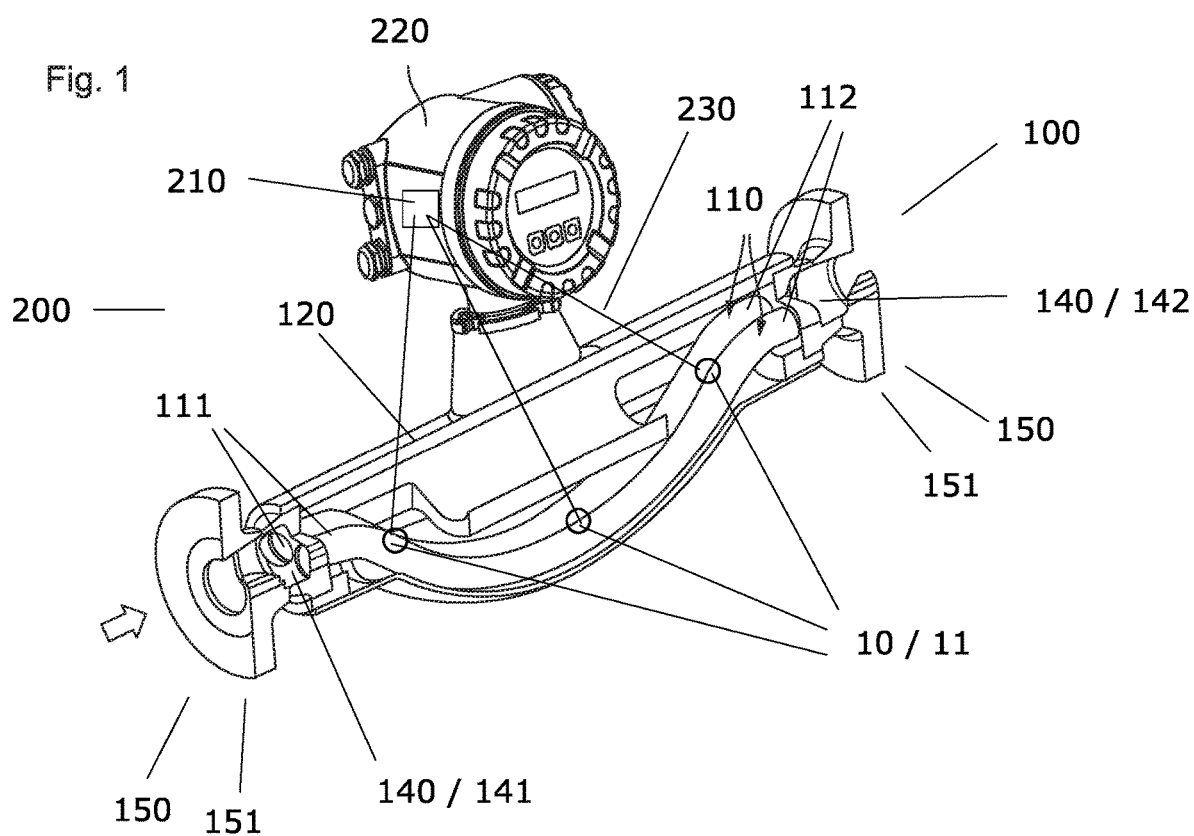
FIG. 1 shows a measurement device having a measuring transducer of the present disclosure.

FIG. 1 shows a measurement device 200 having a measuring transducer 100, wherein the measuring transducer has two measuring tubes 110, which are held by a support body 120 of the measuring transducer. The measuring tubes communicate inlet side with a first manifold 141 and outlet side with a second manifold 142, wherein the first manifold 141 is adapted to receive a medium incoming from a pipeline (not shown) into the measuring transducer and to distribute it uniformly into the measuring tubes. Correspondingly, the second manifold 142 is adapted to receive medium flowing out of the measuring tubes and to transfer such back into the pipeline. The measuring transducer is, in such case, connected with the pipeline via process connections 150, especially flanges 151. The measuring transducer includes an oscillation exciter 11, which is adapted to excite the measuring tubes to oscillate. The measuring transducer includes supplementally two oscillation sensors 10, which are adapted to register oscillations of the measuring tubes.

Those skilled in the art are not limited to the numbers of measuring tubes, oscillation exciters and oscillation sensors discussed here. The embodiment shown here is, in this regard, by way of example.

The measurement device includes an electronic measuring/operating circuit 210, which is adapted to operate the oscillation exciter as well as the oscillation sensors, and to calculate and to output mass flow- and/or density measurement values of the medium. The electronic measuring/operating circuit is, in such case, connected by means of electrical connections 230 with the oscillation sensors as well as the oscillation exciter. The measurement device includes an electronics housing 220, in which the electronic measuring/operating circuit is arranged. For determining mass flow, the measurement device utilizes the Coriolis effect, which acts on the flowing medium due to measuring tube oscillations, wherein the flow of measuring tube influences oscillations characteristically.

Figure 2:
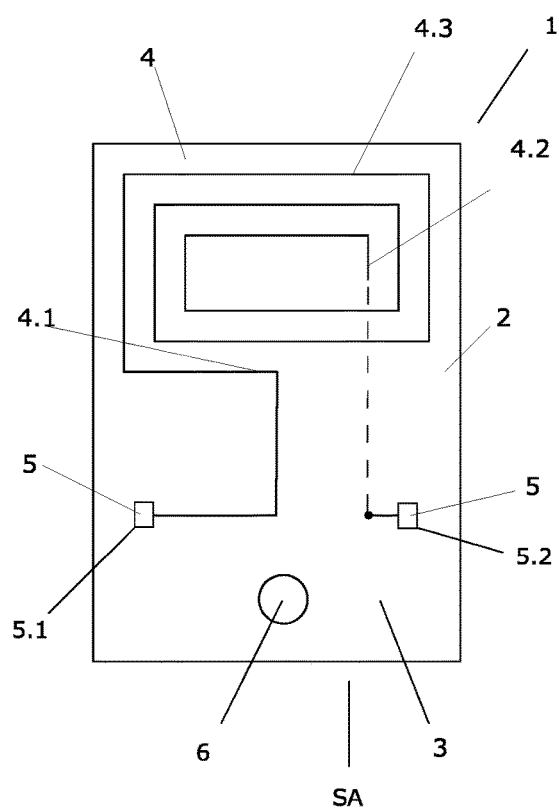
FIG. 2 shows a coil device.

FIG. 2 shows a plan view of a coil device 1 having a circuit board 2 having a first face 3.1 and a second face (not shown). A coil 4 having a first coil end 4.1 and a second coil end 4.2 is applied, such as shown here, on the first face 3.1 in the form of an electrically conductive trace 4.3. The coil device includes contacting elements 5, including a first contacting element 5.1 and a second contacting element 5.2. The first contacting element is, in such case, connected with the first coil end 4.1, and the second contacting element is connected with the second coil end 4.2. The contacting elements are adapted to be contacted with electrical connection lines 230, by means of which the coil device is connectable with the electronic measuring/operating circuit. The circuit board can be a multilayer circuit board, and have coils on a plurality of the circuit board layers, wherein adjoining coils are connectable, for example, by means of vias. Those skilled in the art can design coil devices according to their particular requirements. The coil device shown in FIG. 2 is purely by way of example, and is not to be construed as limiting. The circuit board can, such as shown here, have a bore 6 for receiving a screw, a bolt or a rivet.

Figure 3:
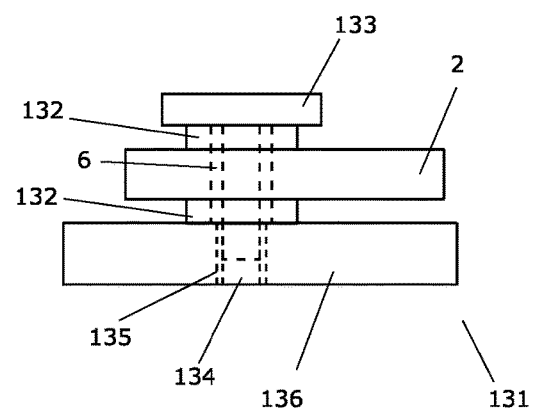
FIG. 3 shows two holder apparatuses of the present disclosure for coil devices.
Figure 3:
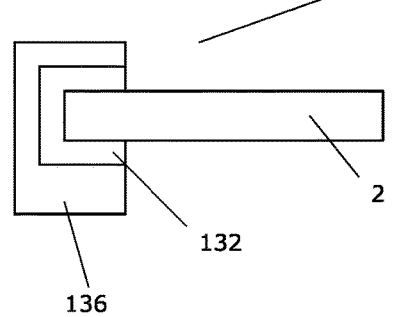

FIGS. 3 *a*) and 3 *b*) show examples holder apparatuses 131 of the invention for a circuit board 2 of a coil device. Each holder apparatus includes a holder apparatus body 136, which is connected, for example, with a measuring tube or with the support body. The geometric embodiment of the holder apparatus can be selected by those skilled in the art to meet particular requirements.

FIG. 3 *a*) shows a holder apparatus 131 having a holder apparatus body 136, two holder elements 132 and a screw 133, wherein the circuit board is clamped by means of the screw between a screw head and the holder apparatus body. Arranged between the circuit board 2 and the screw head, or the holder apparatus body 136, as the case may be, is, in each case, a holder element 132, which is in mechanical contact with the circuit board. The screw extends, in such case, through openings, for example, bores, of the holder elements as well as the circuit board and engages in a screw thread 135 of a bore of the holder apparatus body 136. The bore 6 of the circuit board as well as the openings of the holder elements have, in such case, in each case, a diameter, which can accommodate temperature fluctuation related diameter changes of the screw. Those skilled in the art are guided, in such case, by known coefficients of thermal expansion of the installed materials. The circuit board is, thus, secured by screwing into the holder apparatus body 136.

FIG. 3 b) shows a holder apparatus 131 having a holder apparatus body 136 with a holder element 132, which contacts part of the circuit board 2 and retains by means of a clamping action. Those skilled in the art can design clamps according to particular requirements.

The holder apparatus bodies shown in FIGS. 3 a) and 3 b) are for illustration of the invention. The holder apparatus bodies can have one or more body elements and those skilled in the art can provide holder apparatuses according particular requirements.

According to the invention, the circuit board has a first coefficient of thermal expansion and the at least one holder element a second coefficient of thermal expansion, wherein the first coefficient of thermal expansion and the second coefficient of thermal expansion differ from one another by less than $3*10^{-6}$/Kelvin, and, especially, less than $2*10^{-6}$/Kelvin and preferably less than $1.5*10^{-6}$/Kelvin. In this way, it is assured that the circuit board 2 is retained, on the one hand, by means of lateral frictional interlocking, while temperature change related lateral stresses remain so small that the circuit board remains intact. Such is especially advantageous in the case of brittle circuit board materials, such as, for example, a ceramic.

Preferably, the circuit board is produced by a sintering process, wherein the circuit board comprises, for example, a ceramic material, wherein the ceramic material is especially a low temperature cofired ceramic. Low temperature cofired ceramics (LTCC) are especially suited as foundation for producing coil devices due to good properties as regards low disturbance of coil properties and good applicability of electrically conductive traces, which can be used for forming coils. A disadvantage of such ceramics is, however, their brittle character compared with metals and, thus, their increased sensitivity to mechanical loading. By selecting the first coefficient of thermal expansion and the second coefficient of thermal expansion according to the invention, this disadvantage can, however, be avoided.

Figure 4:
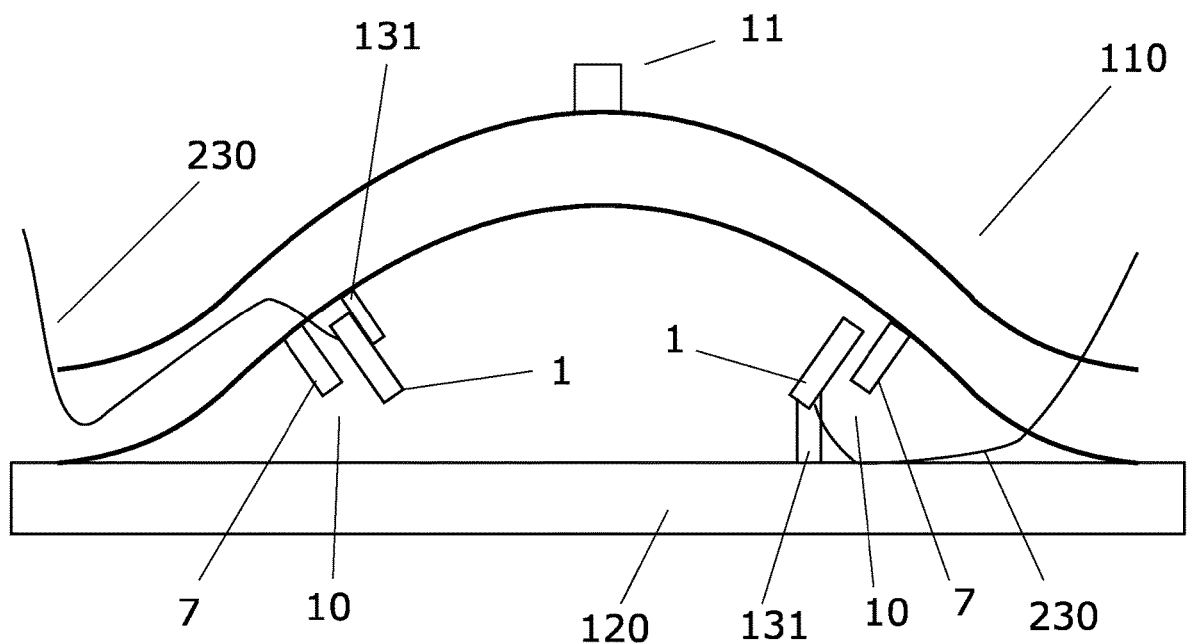
FIG. 4 shows an arrangement of oscillation sensors of a measuring transducer relative to a measuring tube.

FIG. 4 shows schematically a side view as indicated by the label SV of FIG. 2 of a measuring tube 110 of a measurement device having two oscillation sensors 10 comprising, in each case, a coil device 1 of the invention, wherein one oscillation sensor is connected by means of a holder apparatus 131 of the invention with the measuring tube 110 (see left oscillation sensor) and adapted to follow its oscillatory movements, and the other oscillation sensor is connected mechanically with the support body 120 by means of a holder apparatus 131 of the invention (see right coil device). Magnet devices 7, which, such as shown here, are mounted on a second measuring tube covered by the shown measuring tube and are adapted to follow the oscillatory movements of the second measuring tube, interact in measurement operation with the coil devices via electromagnetic fields. In the case of opposing measuring tube oscillations, thus, oscillations are registrable by means of electrical voltages induced in the coils.

In case the coil devices are secured to the measuring tube, such as shown in the case of the left coil device, the electrical connection lines 230 can be led along the measuring tube. In case the coil devices are secured to the support body, such shown as in the case of the right coil device, the electrical connecting lines can be led at the measuring tube along the support body.

Alternatively, the measuring transducer can have, for example, only one measuring tube, wherein a magnet apparatus of a particular sensor is secured, for example, to the measuring tube, and its coil device to the support body, or vice versa.

In case the coils are secured to the support body, each measuring tube includes per oscillation sensor a magnet apparatus with, in each case, at least one magnet.

The different securements of the coil devices shown in FIG. 4 are purely by way of example. Those skilled in the art will preferably secure different coil devices relative to a measuring tube either on the measuring tube or on the support body, in order to enable a symmetric oscillatory behavior of the measuring tube.

The invention claimed is:

1. A measuring transducer of a measurement device for registering a mass flow or a density of a medium flowing through at least one measuring tube of the measuring transducer, comprising:
   the at least one measuring tube having an inlet and an outlet and adapted to convey the medium between inlet and outlet;
   at least one exciter, which is adapted to excite the at least one measuring tube to execute oscillations;
   at least two sensors, which are adapted to register deflection of oscillations of at least one measuring tube;
   wherein at least one exciter as well as the sensors have, in each case, a coil device with, in each case, at least one coil, as well as, in each case, a magnet apparatus, wherein the magnet apparatuses are movable relative to their coil devices, and
   wherein the magnet apparatus and the coil device of an exciter, or sensor, interact with one another by means of magnetic fields,
   wherein the coil device has a circuit board with at least one circuit board layer, wherein the coil is arranged on or in at least one circuit board layer, wherein the circuit board has a first coefficient of thermal expansion,
   wherein the measuring transducer has a support body, which is adapted to hold the measuring tube,
   wherein at least one coil device of the sensors or the coil device of the exciter are/is secured using a holder apparatus to the support body or to a measuring tube, wherein the holder apparatus is adapted to clamp the circuit board, in order to hold the circuit board using lateral frictional interlocking, wherein the circuit board is mechanically contacted by the holder apparatus by means of at least one holder element of the holder apparatus, wherein the holder element has a second coefficient of thermal expansion,
wherein the first coefficient of thermal expansion and the second coefficient of thermal expansion differ from one another by less than $3*10^{-6}$/Kelvin;
   wherein the circuit board is produced by a sintering process, wherein the circuit board comprises a ceramic material, and wherein the ceramic material is a low temperature cofired ceramic;
   wherein the holder element comprises at least one of the following materials: zirconium titanium, tantalum.

2. The measuring transducer of claim 1, wherein the first coefficient of thermal expansion is less than $9*10^{-6}$/Kelvin.

3. The measuring transducer of claim 1, wherein the circuit board is held using a screwed or clamped securement.

4. The measuring transducer of claim 3, wherein the circuit board includes a bore, in which a screw is arranged, which engages in a screw thread of a bore of the holder apparatus, wherein by means of the screw a compression is exerted on the circuit board.

5. The measuring transducer of claim 1, wherein the holder element is secured to a holder apparatus body.

6. The measuring transducer of claim 1, wherein the holder apparatus is secured to the support body.

7. The measuring transducer of claim 1, wherein the measuring transducer includes two manifolds, wherein a first manifold is adapted on an upstream side of the measuring transducer to receive a medium coming from a pipeline into the measuring transducer and to convey the medium to the inlet of the at least one measuring tube, wherein a second manifold is adapted to receive the medium coming from the outlet of the at least one measuring tube and to convey such back into the pipeline.

8. The measuring transducer of claim 1, wherein the measuring transducer includes two process connections, which are adapted to connect the measuring transducer into a pipeline.

9. A measuring device comprising:
a measuring transducer, including:
at least one measuring tube having an inlet and an outlet and adapted to convey medium between inlet and outlet;
at least one exciter, which is adapted to excite the at least one measuring tube to execute oscillations;
at least two sensors, which are adapted to register deflection of oscillations of at least one measuring tube;
wherein at least one exciter as well as the sensors have, in each case, a coil device with, in each case, at least one coil, as well as, in each case, a magnet apparatus, wherein the magnet apparatuses are movable relative to their coil devices, and
wherein the magnet apparatus and the coil device of an exciter, or sensor, interact with one another by means of magnetic fields,
wherein the coil device has a circuit board with at least one circuit board layer, wherein the coil is arranged on or in at least one circuit board layer, wherein the circuit board has a first coefficient of thermal expansion,
wherein the measuring transducer has a support body, which is adapted to hold the measuring tube,
wherein at least one coil device of the sensors or the coil device of the exciter are/is secured using a holder apparatus to the support body or to a measuring tube,
wherein the holder apparatus is adapted to clamp the circuit board, in order to hold the circuit board using lateral frictional interlocking, wherein the circuit board is mechanically contacted by the holder apparatus by means of at least one holder element of the holder apparatus, wherein the holder element has a second coefficient of thermal expansion,
wherein the first coefficient of thermal expansion and the second coefficient of thermal expansion differ from one another by less than $3*10^{-6}$/Kelvin,
an electronic measuring/operating circuit, wherein the electronic measuring/operating circuit is adapted to operate the sensors and the exciter, and is connected with such by means of electrical connection lines,
wherein the at least one electrical connection is led by means of a cable guide to the electronic measuring/operating circuit,
wherein the electronic measuring/operating circuit is further adapted to ascertain mass flow measured values and/or density measurement values, and
wherein the measurement device has an electronics housing for housing the electronic measuring/operating circuit;
wherein the circuit board is produced by a sintering process, wherein the circuit board comprises a ceramic material, and wherein the ceramic material is a low temperature cofired ceramic;
wherein the holder element comprises at least one of the following materials: zirconium titanium, tantalum.

* * * * *